(12) United States Patent
Columbia

(10) Patent No.: US 10,166,827 B2
(45) Date of Patent: Jan. 1, 2019

(54) MULTI-FUNCTION HITCH ACCESSORY RETAINING DEVICE AND METHOD

(71) Applicant: John R. Columbia, Brownsville, PA (US)

(72) Inventor: John R. Columbia, Brownsville, PA (US)

( * ) Notice: Subject to any disclaimer, the term of this patent is extended or adjusted under 35 U.S.C. 154(b) by 0 days.

(21) Appl. No.: 15/005,395

(22) Filed: Jan. 25, 2016

(65) Prior Publication Data

US 2016/0137012 A1    May 19, 2016

Related U.S. Application Data

(63) Continuation of application No. 13/748,629, filed on Jan. 24, 2013, now Pat. No. 9,242,521.

(60) Provisional application No. 61/590,437, filed on Jan. 25, 2012.

(51) Int. Cl.
 *B62D 1/14* (2006.01)
 *B60D 1/52* (2006.01)

(52) U.S. Cl.
 CPC ..................... *B60D 1/52* (2013.01)

(58) Field of Classification Search
 CPC ........................................ B60D 1/52
 USPC ........................................ 280/495
 See application file for complete search history.

(56) References Cited

U.S. PATENT DOCUMENTS

| | | |
|---|---|---|
| 3,139,291 A | 6/1964 | Geresy |
| 4,196,918 A | 4/1980 | Strader |
| 4,385,792 A | 5/1983 | Baur et al. |
| 5,288,095 A | 2/1994 | Swindall |
| 5,678,809 A | 10/1997 | Nakagawa et al. |
| 5,730,456 A | 3/1998 | Bowers |
| 6,409,203 B1 | 6/2002 | Williams |
| 6,598,897 B1 | 7/2003 | Patti |
| 6,609,725 B1 | 8/2003 | Williams |
| 6,733,029 B2 | 5/2004 | McCoy et al. |
| 6,945,550 B2 | 9/2005 | Williams |
| 6,976,615 B2 | 12/2005 | Dean |
| 7,066,483 B2 | 6/2006 | Makos et al. |
| 7,104,563 B2 | 9/2006 | Makos et al. |
| 7,338,065 B1 | 3/2008 | Clausen |
| 7,566,050 B1 | 7/2009 | Lee |
| 8,061,697 B1 | 11/2011 | Lee |
| 8,226,107 B2 | 7/2012 | Columbia |
| 8,371,603 B2 | 2/2013 | Columbia |
| 9,090,136 B2 | 7/2015 | Breeden et al. |
| 2007/0089533 A1 | 4/2007 | Englund et al. |
| 2009/0189369 A1 | 7/2009 | Thomas |
| 2009/0241275 A1 | 10/2009 | Johnson et al. |
| 2010/0007116 A1 | 1/2010 | Columbia |

(Continued)

FOREIGN PATENT DOCUMENTS

| | | |
|---|---|---|
| WO | 2008097951 A2 | 8/2008 |
| WO | 2008097951 A3 | 10/2008 |

*Primary Examiner* — Joseph M Rocca
*Assistant Examiner* — Conan D Duda
(74) *Attorney, Agent, or Firm* — The Webb Law Firm

(57) ABSTRACT

A multi-function hitch accessory retaining device and method which includes an assembly comprising a housing, receiver engagement pin, biasing mechanism, fastener, and coupling pin that is inserted into an accessory shank and configured to easily engage and disengage a conventional hitch receiver as well as a method of firmly securing the shank within the hitch receiver tube.

12 Claims, 9 Drawing Sheets

(56) References Cited

U.S. PATENT DOCUMENTS

2010/0047034 A1\* 2/2010 Stephen ................ F16B 33/006
  411/383
2010/0096836 A1\* 4/2010 Chang ................... B60D 1/241
  280/507

\* cited by examiner

MULTI-FUNCTION HITCH ACCESSORY RETAINING DEVICE AND METHOD

CROSS-REFERENCE TO RELATED APPLICATIONS

This application is a continuation application of U.S. application Ser. No. 13/748,629, filed Jan. 24, 2013, now U.S. Pat. No. 9,242,521, issued Jan. 26, 2016, which claims the benefit of U.S. Provisional Application No. 61/590,437, filed Jan. 25, 2012, all of which applications and patent are herein incorporated by reference in their entirety.

BACKGROUND OF THE INVENTION

1. Field of the Invention

The present invention relates generally to trailer hitch accessories and, more particularly, to an improved accessory retaining device and method that provides a convenient and easy method of engaging and disengaging a hitch accessory's shank in a trailer hitch receiver tube as well as a method of firmly securing the shank within the hitch receiver tube.

2. Technical Considerations

Initially, vehicle trailer hitches were comprised of a tow ball fastened to a drawbar that was non-removably attached to the rear bumper or undercarriage of a vehicle. The drawbar and tow ball permanently protruded from the rear of the vehicle. A disadvantage of the hitch was that the drawbar could not be removed when the hitch was not in use. Oftentimes, individuals would injure their shins by bumping into the hitch when walking behind the vehicle. Owing to the hitch extending beyond the rear bumper, people would also oftentimes unintentionally back into objects causing property damage. In addition, the tow ball would often block the license plate on the rear of the vehicle and, thus, when not using the hitch for towing, the tow ball needed removed from the drawbar so as not to illegally obstruct the license plate. Removing the tow ball required the use of heavy tools not always readily available and was an inconvenient and time-consuming chore. As a result of these disadvantages, a much improved receiver-type hitch was developed that eliminated the described weaknesses and offered additional benefits as well. Consequently, the most common types of motor vehicle hitches in use today are receiver-type hitches.

Receiver-type hitch assemblies are well known and generally comprise a four-sided, hollow receiver tube connected to a support structure that is attached to a vehicle's frame rails. The hollow receiver tube is generally square in shape and rectangular in length. The receiver tube generally comprises at least two aligned apertures located in opposing sidewalls for receiving a hitch pin to secure a removable accessory within the receiver when the accessory's shank is inserted into the receiver and corresponding apertures in the accessory's shank are aligned with the apertures in the receiver. When a receiver-type hitch is attached to a vehicle's undercarriage, the receiver tube is generally located or positioned at the rear center of the vehicle underneath the rear bumper and generally does not extend beyond the most rearward portion of the vehicle. A benefit of a receiver-type hitch is that when a tow ball or other hitch accessory is not in use, the accessory can be removed from the receiver hitch.

Receiver-type hitch-mounted accessories comprise a four-sided shank with an external dimension slightly smaller than the internal dimension of the vehicle's hitch receiver tube, thus permitting the shank to be slidably inserted into the receiver tube. An accessory shank further comprises at least two aligned apertures located in opposing sidewalls for aligning with the apertures in the receiver's sidewalls to receive a hitch pin inserted through both the receiver and accessory shank, thereby securing the accessory in position within the vehicle's hitch receiver tube. Not only are receiver-type hitches useful for accommodating the connection of a drawbar and tow ball for towing, but receiver-type hitches have become a universal connection device or mechanism for attaching a variety of numerous automotive accessories to a vehicle, such as a bicycle carrier, ski rack, canoe rack, ladder rack, luggage rack, truck extension, spare tire carrier, gas can carrier, steps, carry all, ATV carrier, grill carrier, cargo basket, motorcycle carrier, wheelchair carrier, light bar, fishing rod carrier, tool carrier, salt spreader, and numerous other accessories.

While receiver-type hitches are extremely popular, there are two inherent shortcomings.

Firstly, with the hitch receiver tube located underneath the vehicle's rear bumper, the receiver tube is generally close to the ground and in an inconvenient location for detecting aperture alignment and pinning an accessory within the receiver. Based upon the inability to see the apertures for alignment, aligning the apertures in the accessory shank with the apertures in the receiver tube is generally a two-handed operation: one hand used to slowly insert the accessory shank into the receiver and the other hand used to feel with a finger or hold a pin in a receiver aperture to detect when the accessory apertures are aligned with the receiver apertures. Consequently, one must frequently kneel, or sometimes even lay, on the ground to align the apertures and pin the accessory to the hitch. This task becomes even more annoying and/or challenging in darkness, and/or in inclement weather.

Secondly, it is widely recognized that to permit ease of sliding ball mounts and other accessories into a hitch receiver, the outside dimension of the ball mount shank and accessory shank are slightly smaller than the inside dimension of the receiver tubes in which they are inserted. While this space is desirable for ease of attachment insertion and withdrawal, it is undesirable for achieving a snug connection. Too much space between a receiver tube and an accessory shank can cause the accessory to wobble beyond a tolerable amount, and the condition worsens the further an accessory extends from the receiver.

There have been several methods developed and patents issued addressing the two aforementioned shortcomings. For example, U.S. Pat. Nos. 6,598,897 B1 and 7,066,483 address methods of coupling a ball mount to a vehicle's hitch receiver. U.S. Pat. Nos. 6,409,203 B1; 6,609,725 B1; 6,945,550 B2; 6,733,029 B2; and 7,338,065 B1 address methods of reducing accessory wobble or movement within a hitch receiver. While each of these referenced patents discloses assemblies addressing one of the two shortcomings noted in this application, none of these references resolves both shortcomings with a single assembly. Consequently, when choosing a product, consumers must decide between choosing a product that offers enhanced convenience in pinning the accessory to the receiver or one that reduces the wobble within the receiver.

The disclosure in this application is an advancement of the art and provides economic benefit by effectively resolving both shortcomings in a single assembly. This application teaches a hitch accessory coupling product and method that is a multi-function, self-aligning, self-engaging, and tightening hitch coupling assembly.

It is an aspect of the invention to provide improved elements and arrangements thereof for the purposes described which are inexpensive, dependable, and fully effective in accomplishing its intended purposes.

These and other aspects of the present invention will become readily apparent upon further review of the following specification and drawings.

SUMMARY OF THE INVENTION

A hitch accessory retaining device comprises a housing having a cavity and an engagement pin bore. The retaining device further includes an engagement pin having a throughbore. The engagement pin is movable in the engagement pin bore of the housing. A biasing mechanism is configured to bias the engagement pin outwardly from the housing. A fastener is configured to be inserted in the housing cavity and has an internally-threaded bore.

Another hitch accessory retaining device comprises a fastener having an internally-threaded bore. An engagement pin has a retaining lip and a throughbore. A biasing mechanism is positioned between the fastener and the engagement pin, and is configured to bias the engagement pin outwardly away from the fastener.

A further hitch assembly comprises a shank body having a sidewall. A recess is located in the shank sidewall. A bore extends through the shank body and into the recess. An engagement pin has a retaining lip and a throughbore. A biasing device biases the engagement pin outwardly away from the shank. A retaining plate has a bore and the retaining plate is configured to retain the engagement pin and biasing device on the shank body. The engagement pin is slidable in the retaining plate bore.

A method of the invention comprises depressing an engagement pin of a retaining device to a retracted position, inserting the retaining device into the shank of a hitch accessory having a shank aperture, and sliding the retaining device in the shank until the engagement pin engages the shank aperture. To position the shank in a receiver, the engagement pin can be depressed and the shank inserted into the receiver until the engagement pin aligns with and engages a receiver aperture. A hitch pin can be inserted through an engagement pin throughbore and extends through the receiver, the shank, and the retaining device. A lock can be attached to the hitch pin.

BRIEF DESCRIPTION OF THE DRAWINGS

The invention will be described with reference to the following drawing figures, wherein like reference numbers identify like parts throughout.

DETAILED DESCRIPTION OF THE PREFERRED EMBODIMENTS

Figure 1:
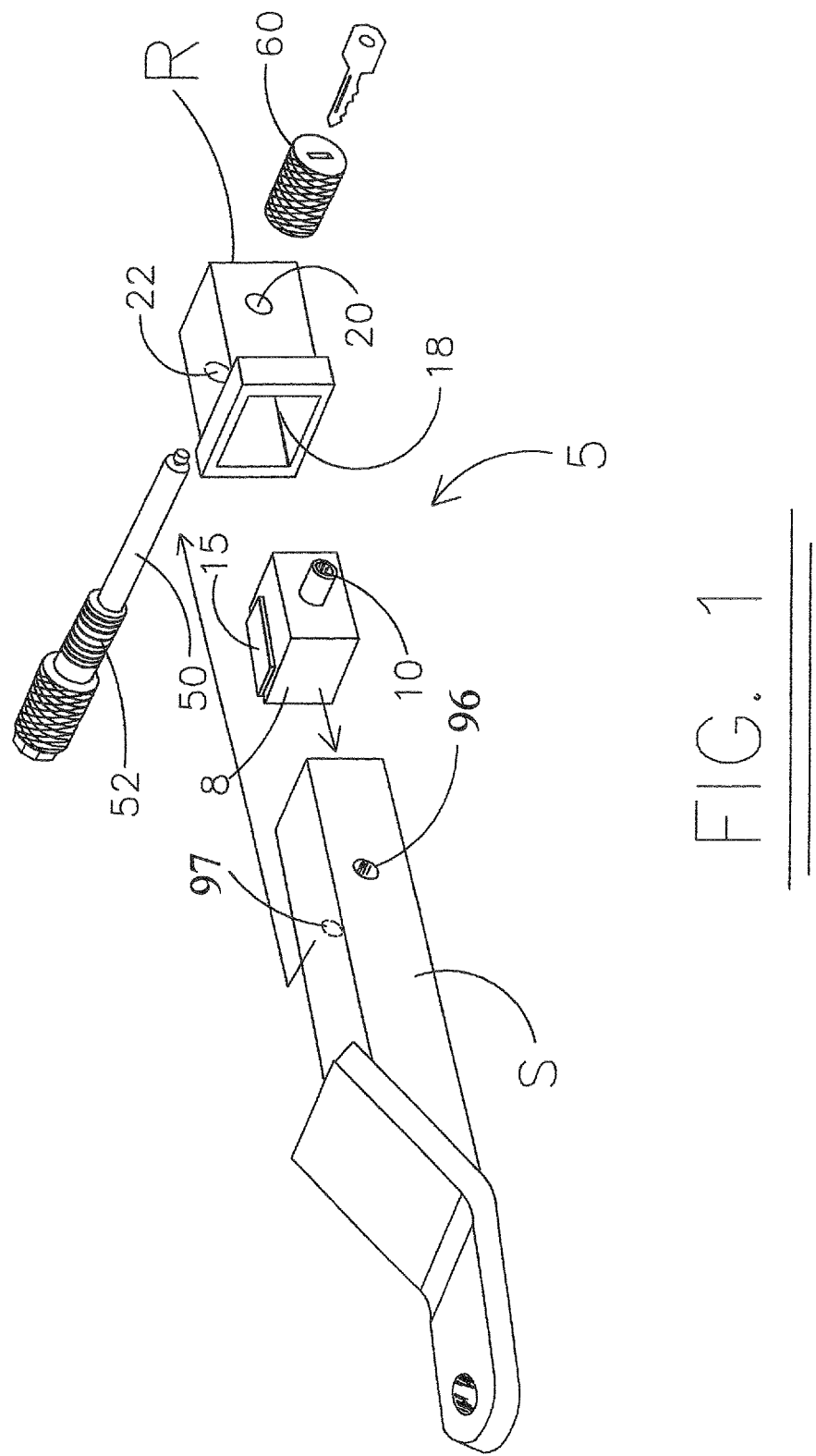
FIG. 1 is an exploded perspective view of a retaining device of the invention in combination with the shank of an accessory device and a receiver tube.

As used herein, spatial or directional terms, such as "top", "bottom", "left", "right", "over", "under", "front", "rear", "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Additionally, all documents, such as but not limited to issued patents and patent applications, and all websites referred to herein, are to be considered to be "incorporated by reference" in their entirety.

The multi-function hitch accessory retaining device and method described and illustrated in the drawings are intended to be illustrative and not exhaustive.

Referring to FIG. 1, there is shown a view of a first embodiment of the inventive multi-function hitch accessory retaining device 5 and method. Multi-function hitch accessory retaining device 5 is inserted into the hollow shank S of hitch accessory (shown as a conventional ball mount) by depressing hollow retractable hitch engagement pin 10 and inserting the retaining device 5 into the open end of the shank S. As retaining device 5 is inserted further into shank S, when hollow retractable hitch engagement pin 10 becomes aligned with aperture 96 in accessory hollow shank S, hollow retractable hitch engagement pin 10 becomes actuated (e.g., is biased outwardly) to an extended position and secures the retaining device 5 within accessory shank S by extending through the aperture 96. With retaining device 5 seated within accessory shank S, hollow retractable hitch engagement pin 10 is depressed and accessory shank S inserted into hollow cavity 18 of receiver R. As shank S is further inserted into receiver R, when hollow retractable hitch engagement pin 10 becomes aligned with aperture 20 in receiver R, hollow retractable hitch engagement pin 10 becomes actuated to an extended position and engages receiver R. With accessory shank S seated within receiver R, hitch pin 50 is inserted through receiver aperture 22, through aperture 97 of shank S, through retaining device 5, through aperture 96 of shank S, and through aperture 20 of receiver R. When external threaded portion 52 of hitch pin 50 contacts cooperating internal threaded fastener 15, hitch pin 50 is rotated to thread itself into fastener 15, pulling accessory shank S tight against the sidewall of receiver R and firmly securing shank S within receiver R. With hitch pin 50 tightened securely, hitch pin lock 60 is attached to hitch pin 50.

Figure 2:
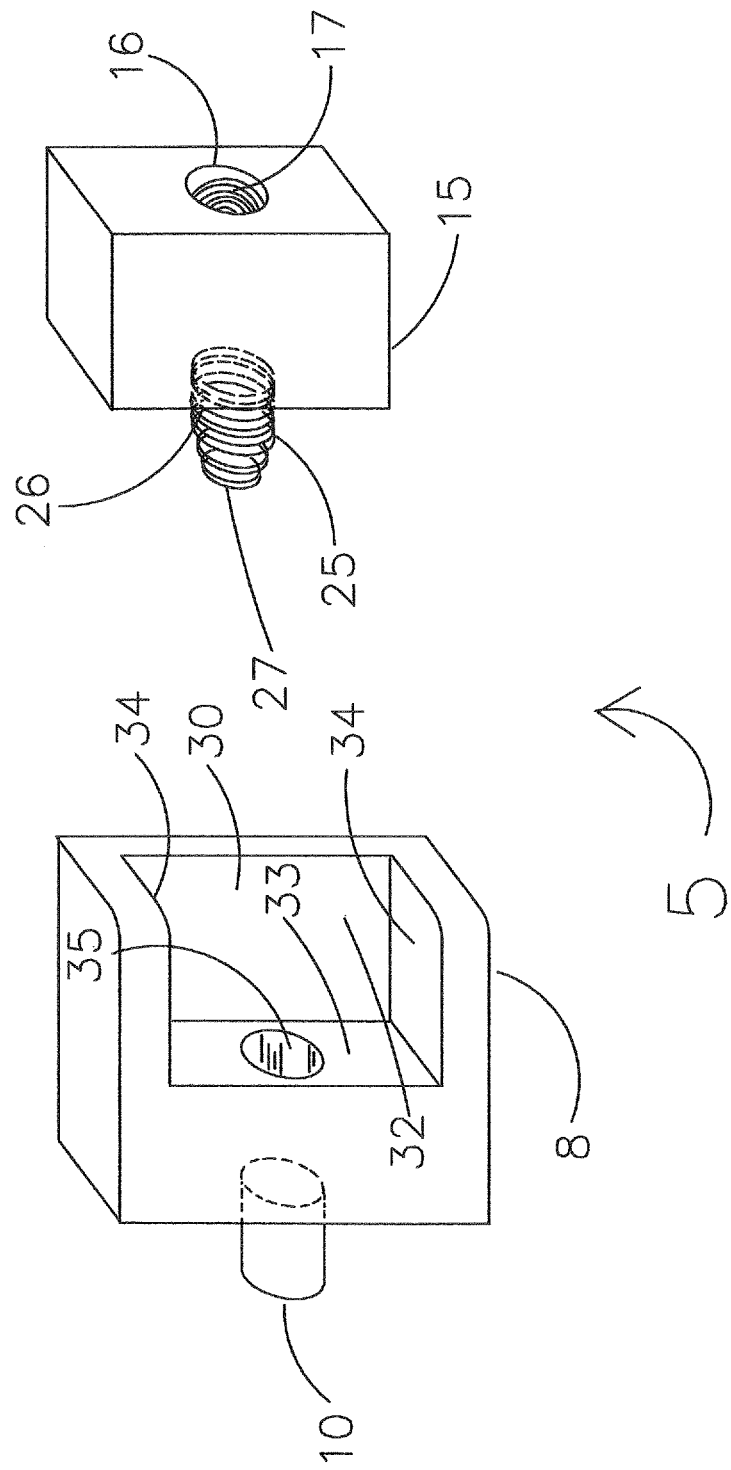
FIG. 2 is a plan view of a housing and fastener of the invention.

In the embodiment shown in FIG. 2, accessory retaining device 5 is comprised of housing 8, hollow retractable hitch engagement pin 10, biasing mechanism 25 (shown as a spring), and internally-threaded fastener 15. Housing 8 is comprised of engagement pin center bore 35 and cavity 30. Housing 8 may be formed from a single piece or assembled from two or more components. The housing 8 can be of any material, such as metal. Cavity 30 may be square or rectangular in shape and is slightly larger in dimension than fastener 15 for allowing housing fastener 15 to be inserted into housing 8. To form the cavity 30, the housing 8 can include a rear wall 33, sidewalls 34, and may have a bottom wall 32 as shown. Cavity 30 is sized to permit fastener 15 to slide back and forth within housing 8, but maintain fastener 15 in a centered position. Spring 25 is tapered with a larger end 26 and a smaller end 27. Larger end 26 of spring 25 abuts or may be attached to fastener 15 and smaller end 27 slides within engagement pin center bore 35 and contacts inner end of hollow retractable hitch engagement pin 10 urging engagement pin 10 in an extended position. Pushing outer end of retractable hitch engagement pin 10 inwardly compresses the pin 10 into the retracted position within engagement pin center bore 35 of housing 8.

Figure 3:
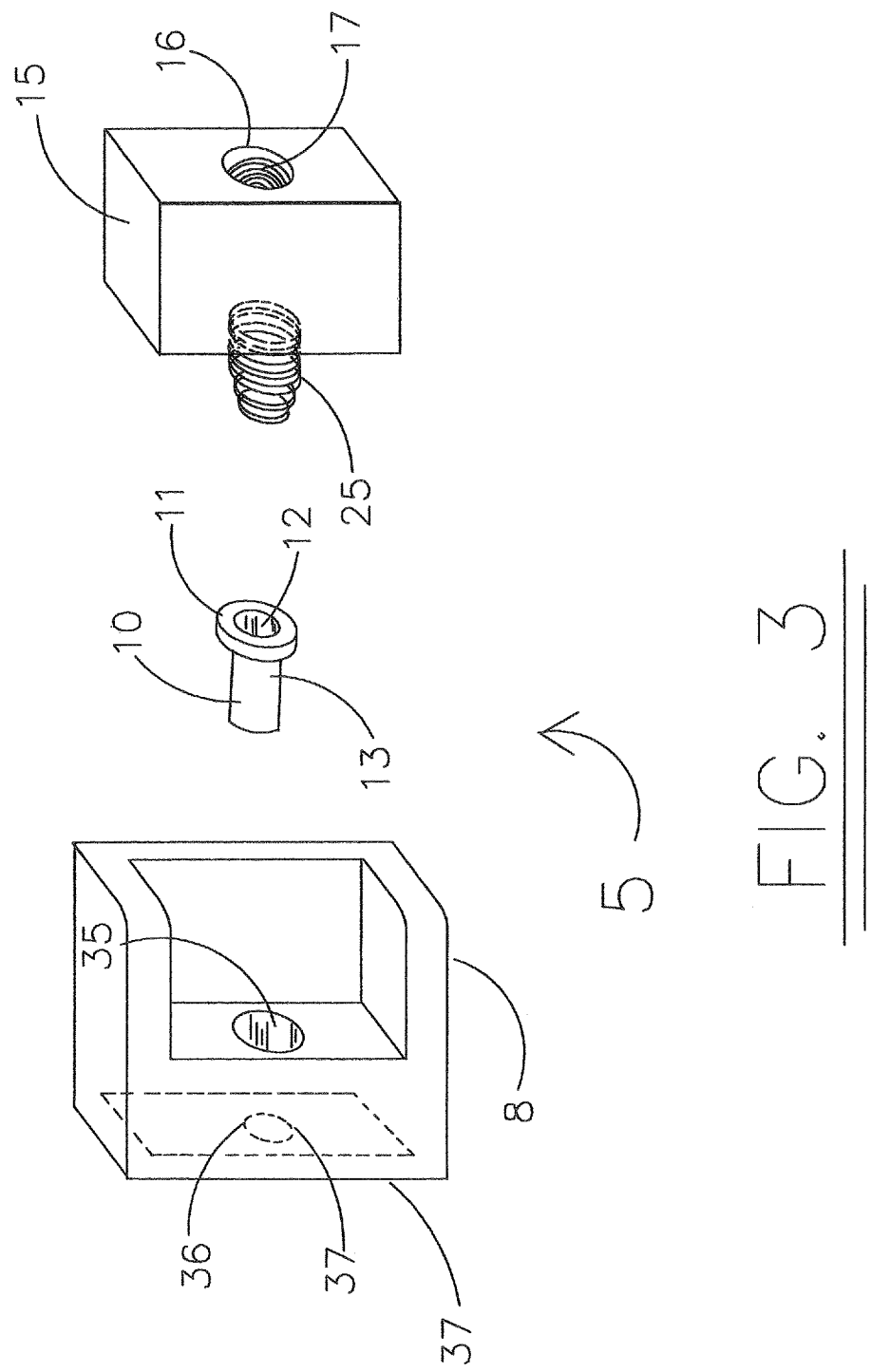
FIG. 3 is a plan view of the housing and fastener of FIG. 1 with the engagement pin removed from the engagement pin bore of the housing.

As shown in FIG. 3, retractable hitch engagement pin 10 is comprised of cylindrical-shaped body 13, retaining lip 11, and center throughbore 12. Center throughbore 12 extends completely through hitch engagement pin 10, making it essentially a hollow hitch engagement pin. Center throughbore 12 permits hitch pin 50 to pass through entire multi-function hitch accessory retaining device assembly 5. The inner end of hitch engagement pin 10 is comprised of retaining lip 11, which is larger in diameter than body 13. Retaining lip 11 retains hitch engagement pin 10 within engagement pin center bore 35 when hitch engagement pin 10 is in its normal extended position. With the exception at outer sidewall 37, engagement pin center bore 35 is slightly larger in diameter than the outermost surface of retaining lip 11 to permit hitch engagement pin 10 to move in the center bore 35 and extend out of and retract into the housing 8. At sidewall 37, engagement pin center bore 35 is smaller in diameter (formed as a blind bore) and sized just slightly larger than the diameter of hitch engagement pin body 13. When hitch engagement pin 10 is in its extended position, hitch engagement pin retaining lip 11 contacts sidewall 37, retaining hitch engagement pin 10 within housing 8. Fastener 15 includes a throughbore 16 containing internal thread convolution 17 to cooperate with external thread 52 on hitch pin 50.

Figure 4:
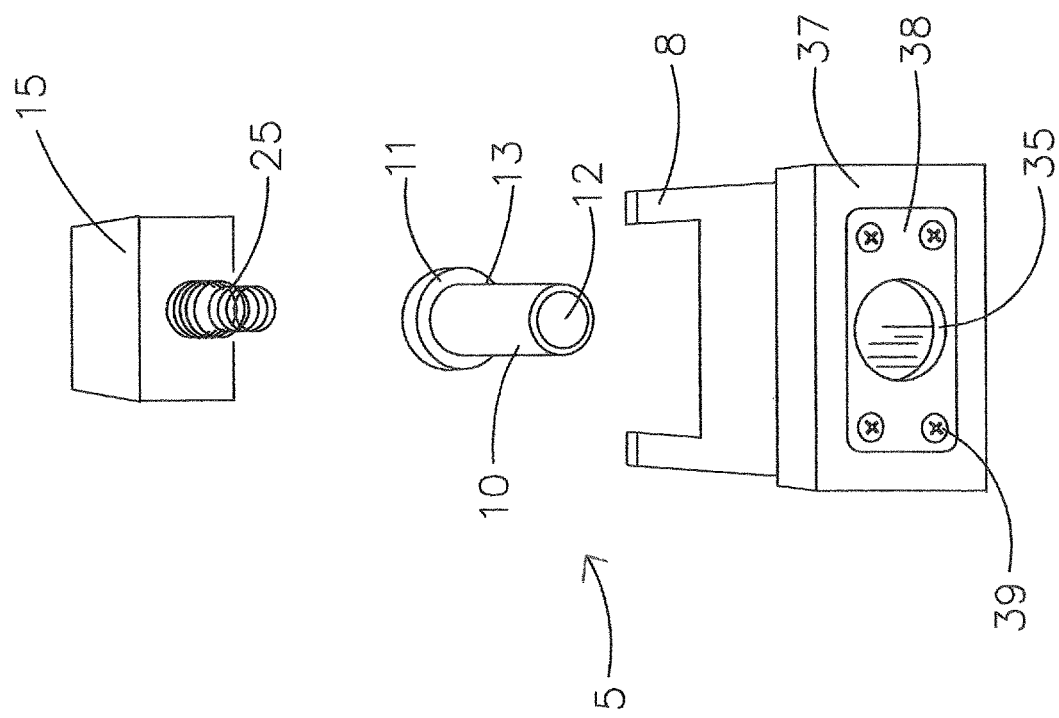
FIG. 4 is a side view of another housing embodiment of the invention.

Referring to FIG. 4, there is shown a housing 8 with a sidewall 37 comprising separate retaining plate 38 with smaller engagement pin center bore 35 in lieu of dual size blind bore as shown in FIG. 3. In this embodiment, retaining plate 38 is attached to housing sidewall 37 with screws 39.

Figure 5:
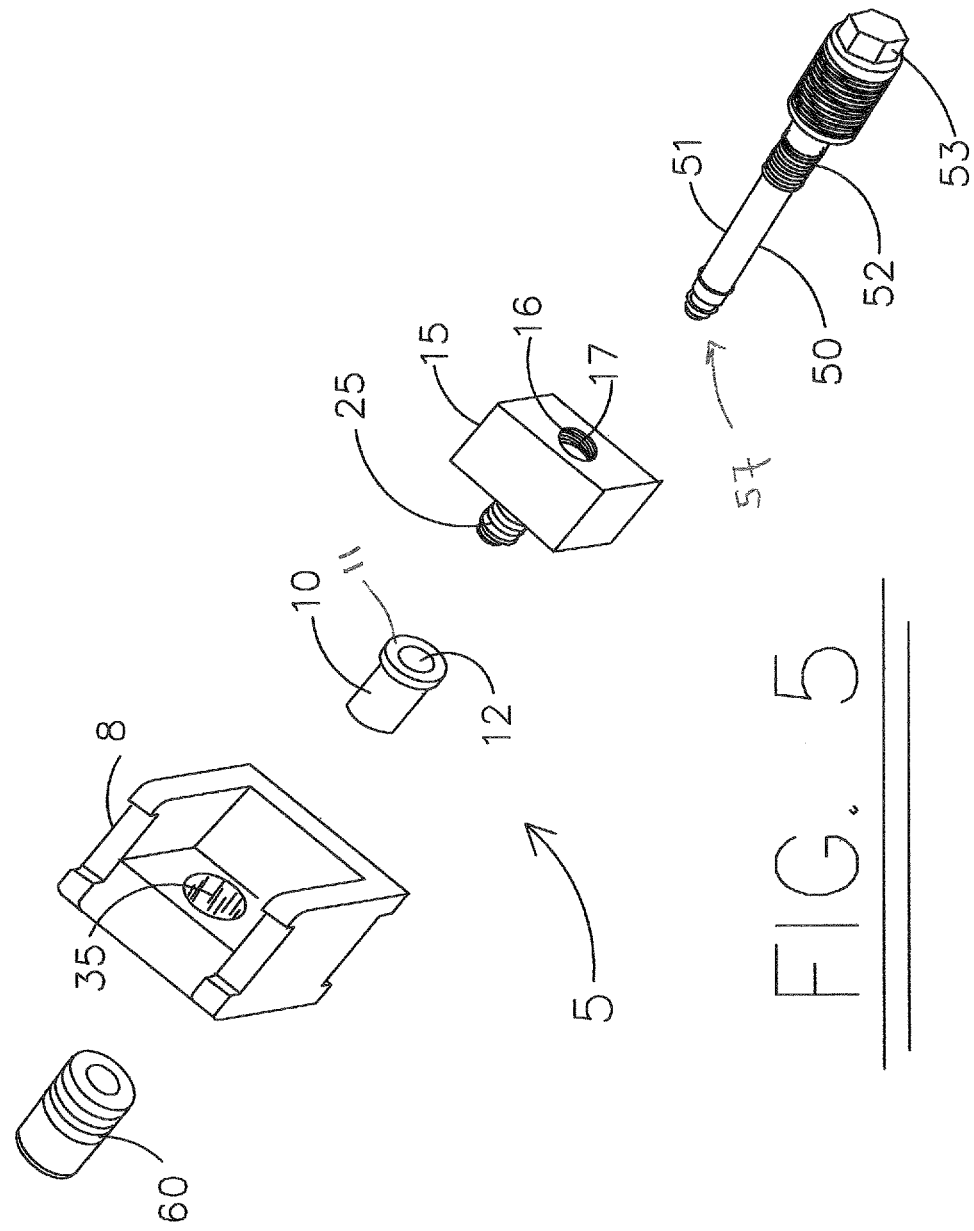
FIG. 5 is a plan view of the housing and fastener of FIG. 3 incorporating a hitch pin.

As shown in FIG. 5, hitch pin 50 is comprised of shank 51, external thread convolution 52, and hexagonal-shaped end 53. Hitch pin 50 can be inserted through a receiver aperture, through an aperture of the shank S, through assembly 5 (through throughbore 17 of fastener 15, through spring 25, through throughbore 12 of retractable engagement pin 10, through engagement pin center bore 35 of housing 8), through the other shank aperture, and through the other receiver aperture such that the end of the hitch pin shank 51 extends out of the receiver aperture. When external threaded portion 52 of hitch pin 50 contacts cooperating internal threaded region 17 of fastener 15, hitch pin 50 is rotated to thread itself into fastener 15, pulling accessory shank S tight against the sidewall of receiver R and firmly securing shank S within receiver R. With hitch pin 50 tightened securely, hitch pin lock 60 is attached to hitch pin 50, resulting in a hitch accessory coupling product and method that is a multi-function, self-aligning, self-engaging, and tightening hitch coupling assembly.

Figure 6:
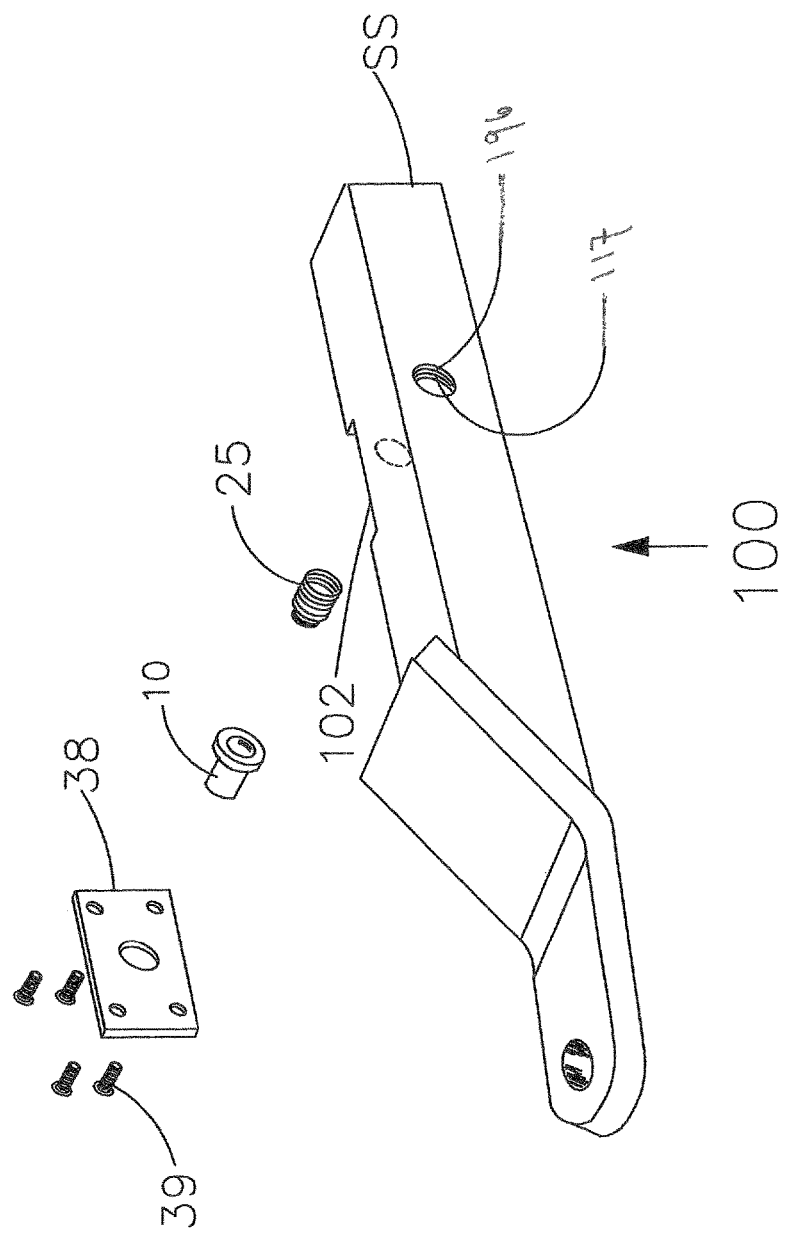
FIG. 6 is a side view of an accessory shank incorporating another retaining device of the invention.

Referring to FIG. 6, there is shown another embodiment of the inventive multi-function, self-aligning, self-engaging, and tightening hitch coupling assembly 100. In this embodiment, the self-aligning, self-engaging, and tightening hitch coupling assembly and method is modified to apply to a hitch accessory shank that is solid as opposed to hollow. In this embodiment, a little less than approximately one half of throughbore 96 in the solid shank is comprised of internal thread convolution 17 from one sidewall of shank SS towards the center of solid shank SS. The opposing sidewall has a slight recess 102 to permit retaining plate 38 to be secured to solid shank SS with screws 39, wherein, after retaining plate 38 is installed on solid shank SS, the outer surface of retaining plate 38 is flush with the outer sidewall surface of solid shank SS. In this embodiment, prior to attaching retaining plate 38 to solid shank SS, spring 25 and hollow hitch engagement pin 10 are inserted into throughbore 96. The throughbore 96 can be sized such that the spring 25 and pin 10 can extend into one end of the throughbore 96 but not all of the way through, e.g., a blind bore.

Figure 7:
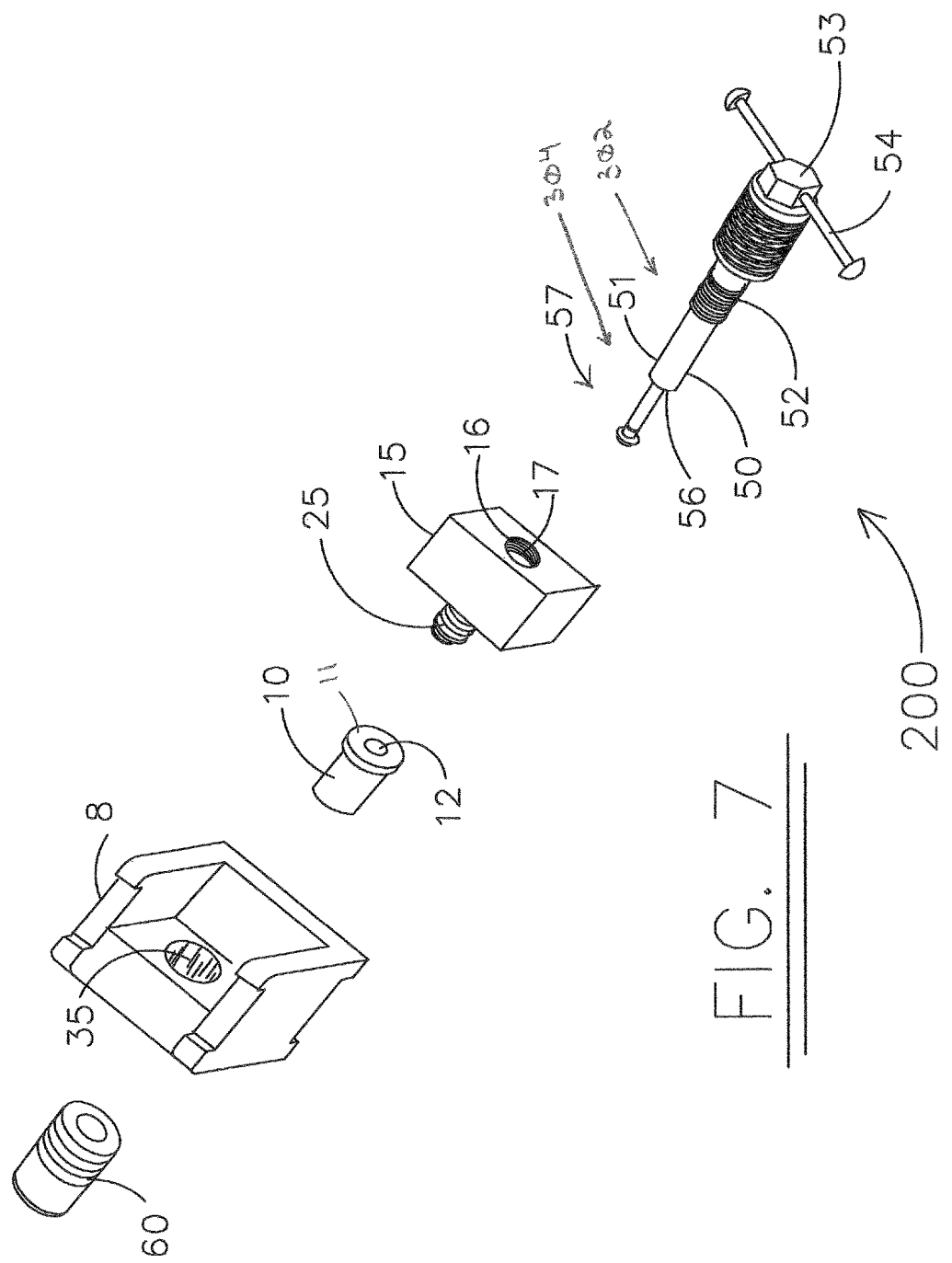
FIG. 7 is a plan view of a retaining device similar to FIG. 5 but with a different hitch pin of the invention.
Figure 8:
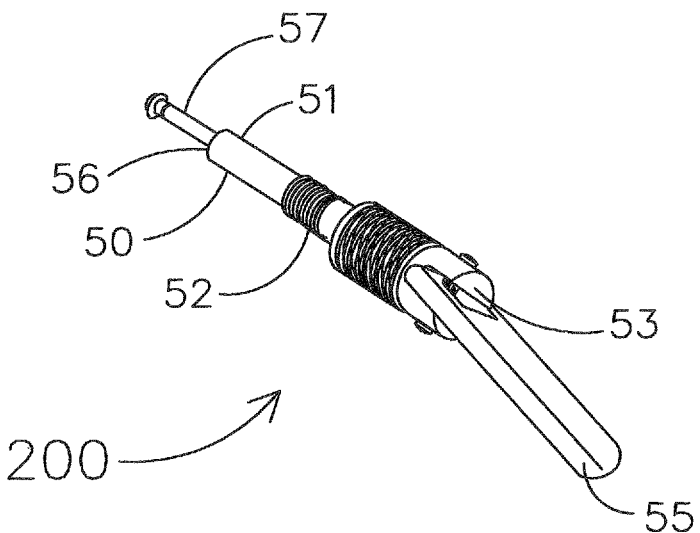
FIG. 8 is an end view of a further hitch pin of the invention.
Figure 9:
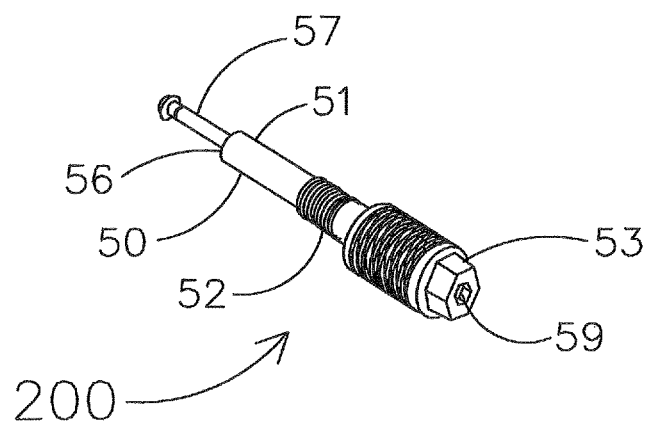
FIG. 9 is an end view of an additional hitch pin of the invention.

Hexagonal-shaped end 53 of hitch pin 50 may be modified and configured to aid in threading and firmly tightening the hitch pin 50. Some illustrative configuration examples, which are not intended to be exhaustive, are shown in FIGS. 7, 8, and 9. FIG. 7 shows a hitch pin 50 including an adjustable T-handle; FIG. 8 shows a hitch pin 50 including a swivelable L-shaped handle; and FIG. 9 shows a hitch pin 50 including a hexagonal blind bore cavity.

Referring to FIG. 7, there is shown another embodiment 200 of the retaining device. In this embodiment, the hitch pin 50 is modified to include a dual-sized diameter shank. The hitch pin end 57, which is opposite the hexagonal-shaped end 53, is smaller in diameter than the diameter of the remainder of the hitch pin shank. Hitch pin 50 is configured to include, at the point where the shank diameters change, a flat surface lip or shoulder 56. Hitch pin end 57 is also slightly smaller than center throughbore 12 in the hitch engagement pin 10. When the hitch pin 50 is installed in the retaining device 5 and the hitch pin threads 52 tightened into the internal cooperating threads 17 of the fastener 15, the flat surface lip 56 abuts the retaining clip 11 of the hitch engagement pin 10, thereby securing the hitch engagement pin 10 in an extended position.

Figure 10:
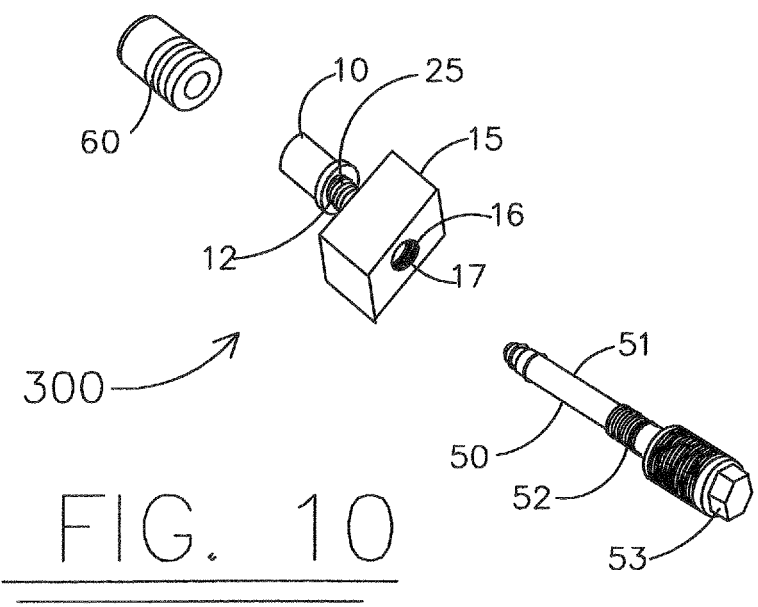
FIG. 10 is a perspective view of a retaining device similar to that of FIG. 5 but in which there is no housing.
Figure 11:
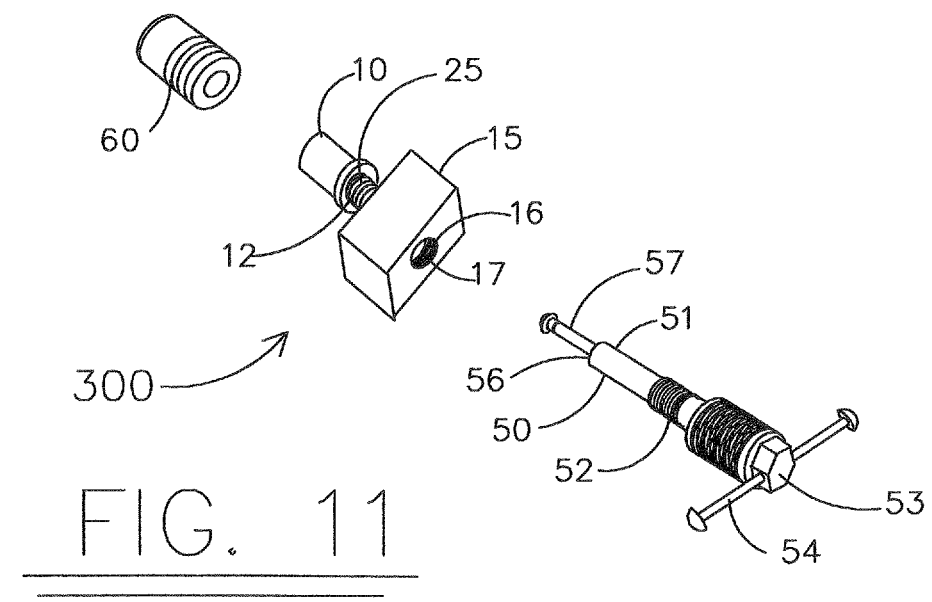
FIG. 11 is a perspective view of a retaining device similar to that of FIG. 7 but in which there is no housing.

Referring to FIGS. 10 and 11, there are shown other embodiments of the multi-function, self-aligning, self-engaging, and tightening retaining device 300. In this embodiment, the housing 8 previously described is eliminated from the assembly and the hollow retractable hitch engagement pin 10 is attached to one end of the biasing spring 25. The fastener 15 is attached to the other end of the biasing spring 25.

It is to be understood that the present invention is not limited to the embodiments described above but encompasses any and all embodiments within the scope of the following claims.

The invention claimed is:

1. A hitch accessory retaining device, comprising:
a hitch pin, comprising:
  a first end and a second end, wherein the second end is configured to be inserted completely through a hitch receiver and an accessory shank, wherein the accessory shank has an aperture;
  a first shank portion and a second shank portion, wherein the second shank portion comprises a smaller diameter than the first shank portion, such that a shoulder is formed between the first shank portion and the second shank portion; and
  a biasing mechanism configured to bias a hollow engagement pin outwardly, wherein the hollow engagement pin comprises a retaining lip;
  wherein when the hollow engagement pin aligns with the accessory shank aperture thereby engaging the accessory shank aperture, the hollow engagement pin is depressable and the accessory shank insertable into a hitch receiver until the hollow engagement pin aligns with a receiver aperture, wherein when the hollow engagement pin aligns with the receiver aperture, the hollow engagement pin is actuated to an extended position and engages the receiver aperture; and
  wherein the second end of the hitch pin is configured to extend through the hollow engagement pin such that the shoulder prevents the hollow engagement pin from fully retracting when the hitch retaining device is installed.

2. The retaining device of claim 1, wherein the hitch pin comprises an externally-threaded region.

3. The retaining device of claim 1, wherein the shoulder comprises a flat surface.

4. The retaining device of claim 2, wherein the externally-threaded region is located on the first shank portion.

5. The retaining device of claim 1, comprising a fastener having an internally-threaded bore configured to engage an externally-threaded region of the hitch pin.

6. The retaining device of claim 5, comprising a housing having a cavity and an engagement pin bore, wherein the fastener is insertable into the housing cavity and the engagement pin is movable in the engagement pin bore.

7. The retaining device of claim 1, wherein the biasing mechanism comprises a spring.

8. The retaining device of claim 1, wherein the first end of the hitch pin includes a handle.

9. The retaining device of claim 1, wherein the first end of the hitch pin includes a blind bore cavity.

10. The retaining device of claim 2, comprising:
a fastener having an internally-threaded bore;
the engagement pin including a body, the retaining lip, and a throughbore; and
wherein the second end of the hitch pin is configured to extend through the fastener bore and the engagement pin throughbore, wherein the externally-threaded region is configured to engage the internally-threaded bore of the fastener.

11. The retaining device of claim 10, comprising a housing having a cavity and an engagement pin bore, wherein the engagement pin is movable in the engagement pin bore, and wherein the fastener is insertable into the housing cavity.

12. The retaining device of claim 2, comprising:
a housing having a cavity and an engagement pin bore;
the engagement pin having a throughbore, the engagement pin movable in the engagement pin bore of the housing;
the biasing mechanism configured to bias the engagement pin outwardly from the housing; and
a fastener configured to be inserted in the housing cavity and having an internally-threaded bore,
wherein the second end of the hitch pin is configured to extend through the fastener bore, the engagement pin throughbore, and the housing engagement pin bore, wherein the externally-threaded region of the hitch pin is configured to engage the internally-threaded region bore of the fastener.

* * * * *

UNITED STATES PATENT AND TRADEMARK OFFICE
CERTIFICATE OF CORRECTION

| | | |
|---|---|---|
| PATENT NO. | : 10,166,827 B2 | Page 1 of 1 |
| APPLICATION NO. | : 15/005395 | |
| DATED | : January 1, 2019 | |
| INVENTOR(S) | : John R. Columbia | |

It is certified that error appears in the above-identified patent and that said Letters Patent is hereby corrected as shown below:

In the Claims

Column 8, Line 36, Claim 12, after "internally-threaded" delete "region"

Signed and Sealed this
Thirteenth Day of February, 2024

Katherine Kelly Vidal
*Director of the United States Patent and Trademark Office*